United States Patent
Yoshinaga et al.

(10) Patent No.: US 7,835,543 B2
(45) Date of Patent: Nov. 16, 2010

(54) OBJECT DETECTION METHOD

(75) Inventors: Tomoaki Yoshinaga, Yokohama (JP); Shigeki Nagaya, Tokyo (JP); Isao Karube, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 845 days.

(21) Appl. No.: 11/739,759

(22) Filed: Apr. 25, 2007

(65) Prior Publication Data

US 2008/0095398 A1 Apr. 24, 2008

(30) Foreign Application Priority Data

Oct. 20, 2006 (JP) ............................. 2006-286018

(51) Int. Cl.
*G06K 9/00* (2006.01)
(52) U.S. Cl. ...................... 382/103; 382/106; 382/291; 348/169
(58) Field of Classification Search ................. 382/103, 382/106, 291; 348/169
See application file for complete search history.

(56) References Cited

U.S. PATENT DOCUMENTS

| 7,212,672 B2 * | 5/2007 | Fujieda et ................... 382/199 |
| 2003/0152271 A1 * | 8/2003 | Tsujino et al. .............. 382/190 |
| 2005/0105771 A1 * | 5/2005 | Nagai et al. .................. 382/103 |
| 2005/0248654 A1 * | 11/2005 | Tsujino et al. .............. 348/169 |
| 2008/0226126 A1 * | 9/2008 | Ohno ......................... 382/103 |

FOREIGN PATENT DOCUMENTS

JP 02-159682 6/1990

OTHER PUBLICATIONS

Paul Viola, et al.; Rapid Object Detection using a Boosted Cascade of Simple Features; Accepted Conference on Computer Vision and Pattern Recognition 2001; pp. 1-9.

* cited by examiner

*Primary Examiner*—Matthew C Bella
*Assistant Examiner*—Shervin Nakhjavan
(74) *Attorney, Agent, or Firm*—Antonelli, Terry, Stout & Kraus, LLP.

(57) ABSTRACT

An object detection method which rapidly detects one or more objects existing in an image includes: a primary search step which judges whether an object exists at a predetermined interval by using a simple judgment device requiring a small number of calculation amounts; a range estimation step which estimates a range where an object actually exists from a spatial relationship obtained as a result of the primary search; a secondary search step which performs an object judgment process by using a secondary judgment device capable of performing more detailed judgment than the object judgment device used in the primary search; an object position estimation step which estimates a position where the similarity is maximum in a certain object existing range as an object existing position; and a final search step which judges a final object position.

11 Claims, 10 Drawing Sheets

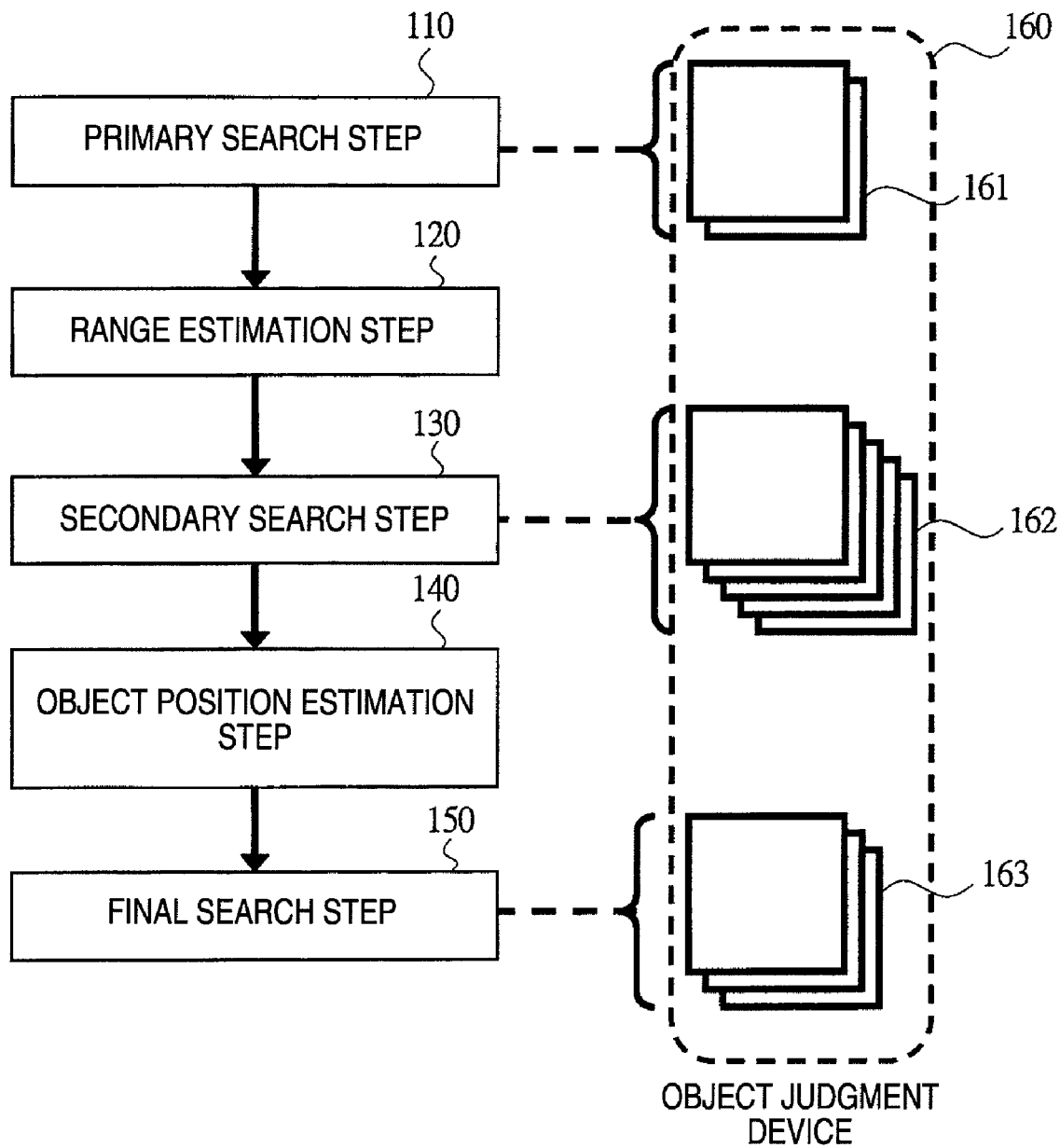

OBJECT DETECTION METHOD

INCORPORATION BY REFERENCE

The present application claims priority from Japanese application JP 2006-286018 filed on Oct. 20, 2006, the content of which is hereby incorporated by reference into this application.

BACKGROUND OF THE INVENTION

The present invention relates to an object detection method for detecting a particular object such as a face from an image and in particular, relates to a technique effectively applied to a high-speed detection process of an object.

A method for detecting a particular object such as a face from an input image is, for example, described in "Rapid Object Detection using a Boosted Cascade of Simple Features," P. Viola, M. Jones, Proceedings IEEE Conf. on Computer Vision and Pattern Recognition, 2001. This document suggests a highly accurate object detection method using three new methods: a set of image features called Haar capable of effectively analyzing a face, a feature selection process based on AdaBoost, and a cascade architecture for learning and detection.

However, when it is unclear wherein the input image an object exists, object judgement processes should be performed at various positions, which requires a plenty of processing time.

When an unknown number of objects of unknown sizes exist at unknown positions in the input image, magnification of the input image is modifies into various sizes and the object judgement process is performed at all the positions on the image.

For example, JP-A-2-159682 discloses a method for rapidly detecting an object from an input image where the information on the object is unknown. In the JP-A-2-159682, a process of performing template matching over the entire image (hereinafter, referred to as search process) is hierarchized in a plurality of levels. For each of the levels, an interval of pixels to be calculated in the template and a threshold value to transfer to a lower node level are set in advance, a correlation value is calculated at a rough position interval starting with the upper level having a smaller number of pixels to be calculated in the template. When a position where the correlation value is equal to or above the threshold value and higher than the periphery is found, a low-level search (calculation of an increased number of pixels to be calculated in the template is performed at a small positional interval) for the region around the position. If the correlation value of the final level exceeds the threshold value, it is judged that the object exists at that position. Thus, it is possible to perform object detection with smaller calculation amount than when performing the template matching on all the positions of the image.

SUMMARY OF THE INVENTION

According to JP-A-2-159682, a calculation amount is increased when the number of correlation calculations (object judgment processes) in the final level is increased.

In contrast to this, there is a solution that the process is terminated upon detection of a position having a higher correlation value than a certain value. In this case, a position shifted by several pixels from the actual object position may be detected. Moreover, when the search interval of the upper node level is set too large, a object detection leak may be generated. When the search interval is set too small, search of a lower node level is required at the position where no object actually exists, which lowers the processing speed.

It is therefore an object of the present invention to provide an object detection method capable of rapidly detecting 1 or more objects existing in an image.

Among the embodiments of the invention disclosed in this application, the representative one is outlined as follows.

An object detection method according to an embodiment of the present invention comprises: a primary search step which performs an object judgment process on positions at a particular interval on an input image by using a primary judgment device for judging presence/absence of an object in a specified image frame by a small calculation quantity; a range estimation step which estimates a range where an object exists according to the primary search step; a secondary search step which performs an object judgment process by using a secondary judgment device for judging presence/absence of an object by a calculation quantity greater than the first primary judgment device for each of one or more object existing ranges obtained by the range estimation step and acquiring similarity with the object; a position estimation step which estimates a position where the object exists by using the similarity obtained by the secondary search step; and a final search step which performs an object judgment process by using a final judgment device for judging the presence/absence of an object by a third calculation quantity which is equal to or greater than the secondary judgment device and judges whether an object actually exists.

The effect obtained by the representative one among the inventions disclosed in this application may be outlined as follows.

According to an embodiment of the present invention, it is possible to rapidly detect one or more objects existing in the image.

Other objects, features and advantages of the invention will become apparent from the following description of the embodiments of the invention taken in conjunction with the accompanying drawings.

BRIEF DESCRIPTION OF THE DRAWINGS

FIG. 1 is a flowchart showing operation of an object detection method according to an embodiment of the present invention.

DESCRIPTION OF THE EMBODIMENTS

Figure 2A:
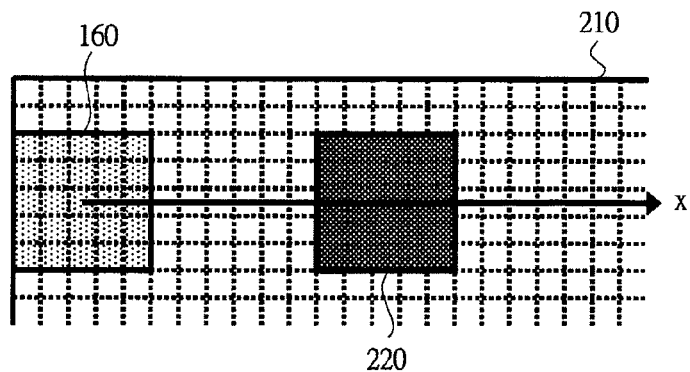
FIG. 2A and FIG. 2B explain an example of object search using an object judgement device based on the object detection method according to the embodiment of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

Description will now be directed to embodiments of the present invention with reference to the attached drawings. It should be noted that like members are denoted in by like symbols in all the drawings for explaining the embodiments and their explanations will not be repeated.

Firstly, explanation will be given on an example of the object detection process according to the present invention.

In this invention, as an object detection process, an object judgement device formed by a plurality of stages are used as an object detection process. At each stage, a feature amount in accordance with the Haar feature is calculated and compared to a threshold value to judge whether it is an object.

If below a certain threshold value, it is judged that no stage clear is present and if above the threshold value, it is judged that a stage clear is present, and control is passed to the judgment process by the next stage.

The object detection position is moved and the number of stage clears in the object judgement device is detected so as to detect an object position.

Moreover, in the explanation below, an object judgment device is used. However, the object judgment device may be any device capable of judging whether an object is present for each of the stages. For example, it is possible to use an object judgment unit formed by a cascade structure of a plurality of stages. Moreover, it is possible to use a plurality of templates as an object judgement unit.

Embodiment 1

Referring to FIG. 1, explanation will be given on the operation of the object detection method according to a first embodiment of the present invention. FIG. 1 is a flowchart showing the operation of the object detection method according to the first embodiment of the present invention.

In FIG. 1, the operation of the object detection method is formed by five steps: a primary search step 110, a range estimation step 120, a secondary search step 130, an object position estimation step 140, and a final search step 150.

In each of the search steps of the primary search, the secondary search, and the final search, the object judgment device 160 is divided to be used as a primary judgment unit 161, a secondary judgment unit 162, and a final judgment unit 163. It should be noted that the final judgment unit 163 may be the same as the secondary judgment unit.

In the explanation below, the judgment whether an object exists at each position in the input image by using the object judgment device will be called an object search.

Next, referring to FIG. 2A and FIG. 2B, explanation will be given on an example of the object search using the object judgment device according to the object detection method according to the first embodiment of the present invention.

Figure 2B:
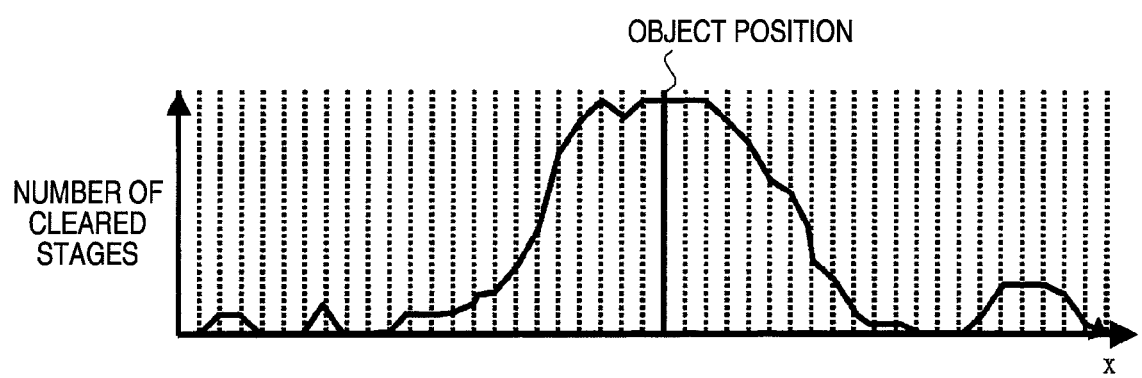

FIG. 2A and FIG. 2B, explain an example of the object search using the object judgment device according to the object detection method according to the first embodiment of the present invention.

In FIG. 2A, an object 220 to be detected exists on a certain position of an input image 210.

When search is performed in the x direction of the input image x by using an object judgment device 160 including a plurality of stages, the object judgement process results at the respective positions may be, for example, as shown in FIG. 2B.

In FIG. 2B, the horizontal axis represents the x axis and the vertical axis represents the number of stages cleared as a result of the object judgment process at a certain x position.

The number of stages cleared in the object judgment may be considered to indicate similarity with the object. The similarity increases as the position approaches the object periphery and a mountain-shaped graph is drawn.

In this embodiment, by using this feature, it is possible to provide a method for rapidly detecting the apexes of the mountains of the similarity graph which are the positions where the object exists, thereby rapidly and accurately detecting an object in the image.

Figure 3:
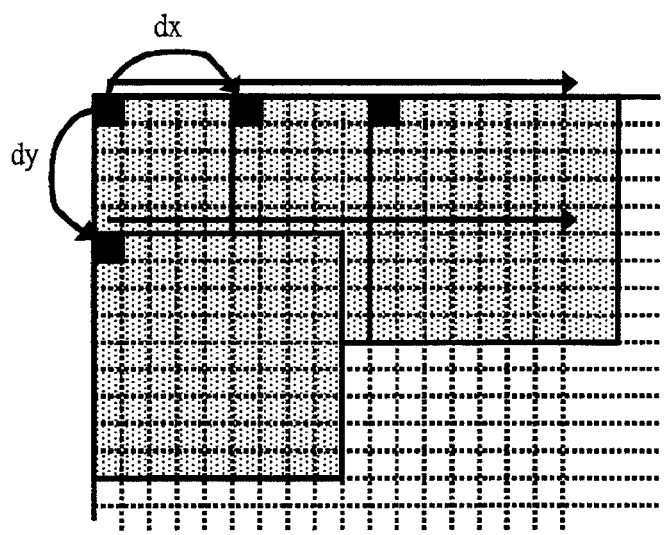
FIG. 3 explains a position where a judgment process is performed at a primary search step of the object detection method according to an embodiment of the present invention.
Figure 4:
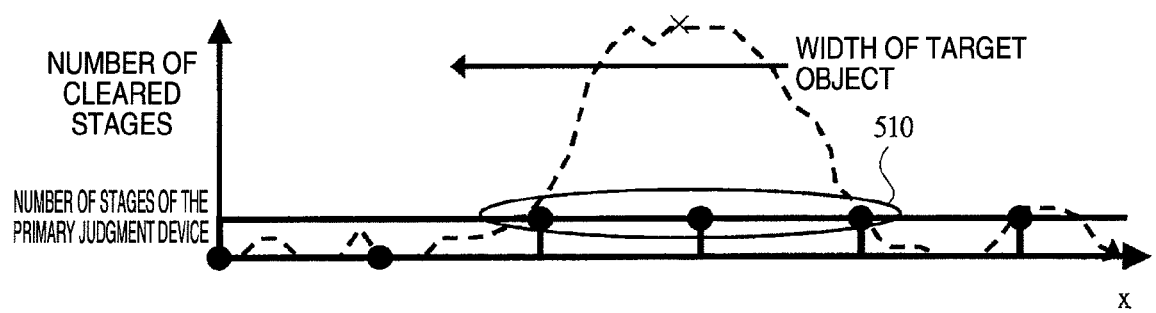
FIG. 4 shows an example of result of performing the primary search step of the object detection method according to the embodiment of the present invention.
Figure 5A:
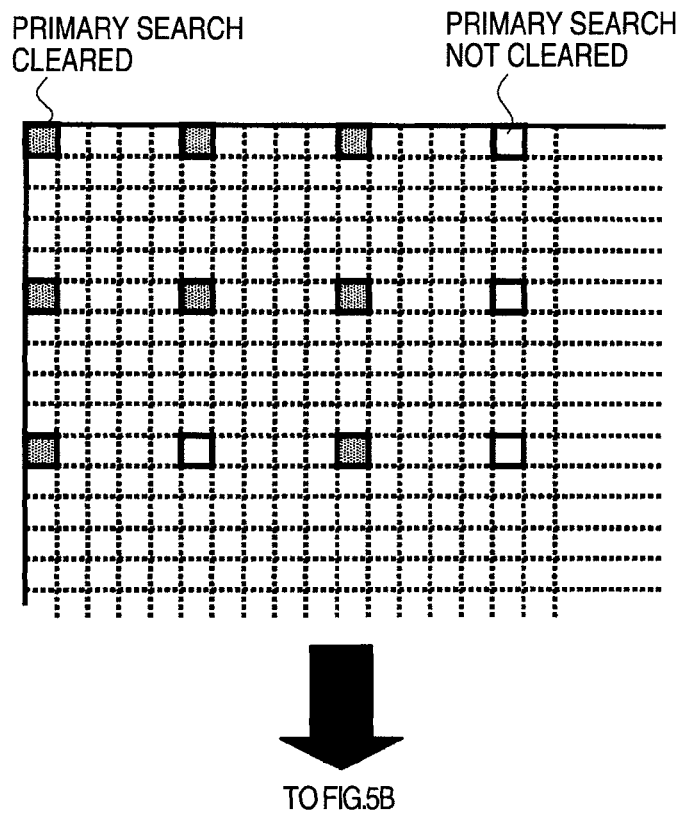
FIGS. 5A and 5B explain a range estimation step of the object detection method according to the embodiment of the present invention.
Figure 5B:
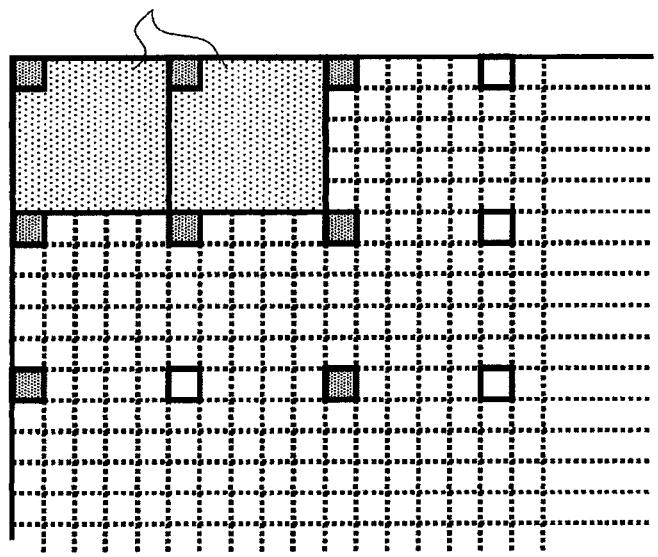
Figure 6A:
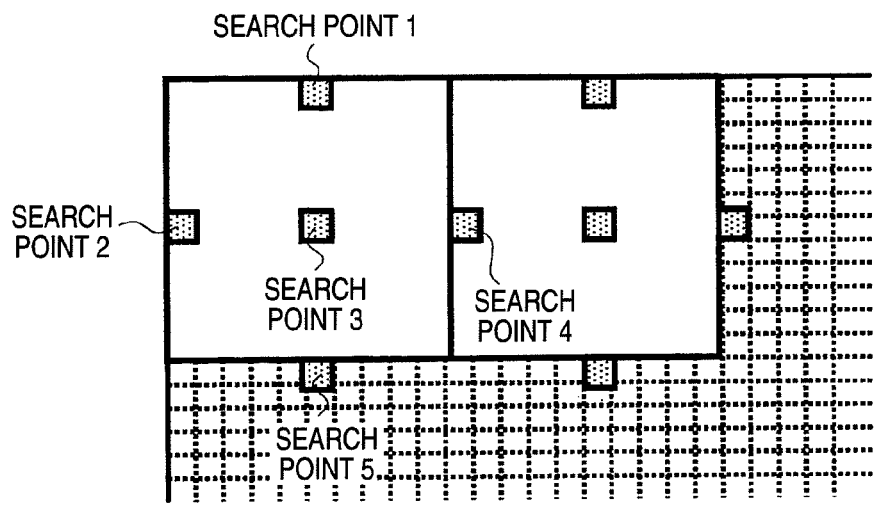
FIGS. 6A and 6B explain a secondary search step of an object detection method according to an embodiment of the present invention.
Figure 6B:
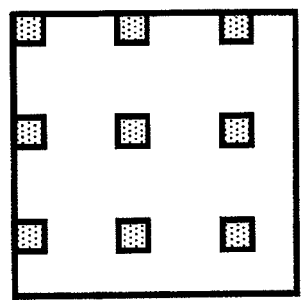
Figure 7A:
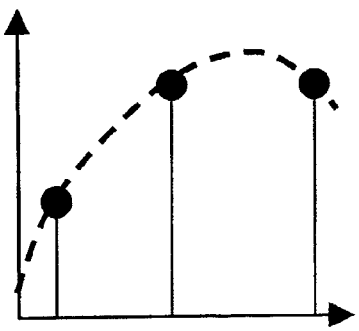
FIGS. 7A and 7B explain an object position estimation step of the object detection method according to the embodiment of the present invention.
Figure 7B:
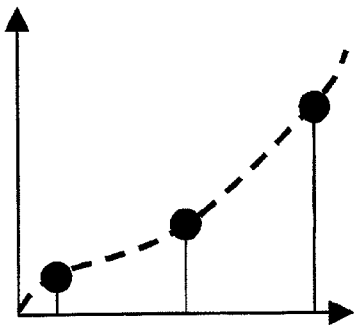

Next, by referring to FIG. 1, FIG. 3 to FIG. 7A, FIG. 7B, explanation will be given on the operation of each step of the object detection method according to the first embodiment of the present invention. FIG. 3 explains the position where a judgment process is performed in the primary search step of the object detection method according to the first embodiment of the present invention. FIG. 4 shows an example of the result of the primary search step performed in the object detection method according to the first embodiment of the present invention. FIGS. 5A and 5B explain a range estimation step of the object detection method according to the first embodiment of the present invention. FIG. 6A and FIG. 6B explain the secondary search step in the object detection method according to the first embodiment of the present invention. FIG. 7A and FIG. 7B explain the object position estimation step in the object detection method according to the first embodiment of the present invention.

Firstly, in the primary search step 110, the primary judgment unit 161 is used to perform a rough search process.

The primary judgment unit 161 is a judgment unit having a small number of stages (such as two or three pieces) performing only a small calculation amount in the object judgment device.

FIG. 3 shows a search process in the primary search step 110.

In the input image, an object judgment process is performed at a large search interval in accordance with the judgment unit size. For example, the search width dx in the horizontal direction of the image is one third of cascade lateral size and the search width dy of the vertical direction is one fourth of the longitudinal size of the judgment unit.

In general, depending on the size of the judgment unit, the width of the mountain of similarity shown in FIG. 2B varies. It is preferable to set the interval that similarity mountain of FIG. 2B can always be detected. Moreover, in the general image, the correlation in the vertical direction is lower than in the horizontal direction and accordingly it is preferable to set dx>dy.

FIG. 4 shows an example of a graph obtained as a processing result of the primary search step 110. The black circles indicates the number of stages cleared in the object judgment process at each search position. The width of the similarity mountain appearing at the periphery of the region where an object exists is mostly two thirds of the object size. Accordingly, by setting the search interval to one third of the object to be detected, it is possible to detect similarity mountain skirts portion with a small number of judgment processes without an omission.

The range estimation step 120 estimates a range where an object exists from the result of the primary search step. More specifically, for coordinates (x, Y) which have cleared the primary search step, judgment process result of the coordinates (x+dx, y), (x, y+dy) positions are checked. If both coordinates have cleared all the stages of the primary cascade, it is estimated that [x, x+dx], [y, y+dy] which are the peripheral regions of the coordinates (x, y) are the object existing range 510.

By performing this range estimation process for all the positions which have cleared the object judgment process in the primary search step 120, it is possible to obtain a plurality of object existing range.

FIGS. 5A and 5B show the process of the range estimation step 120.

For example, when it is judged that objects exists at the positions indicated by black points in FIG. 5A, the object existing range is estimated as shown in FIG. 5B.

By setting the search width (dx, dy) of the primary search step 110 to one third of the similarity mountain appearing at the periphery of the object, the judgement process in the primary search is cleared at a plurality of points around the object position.

For this, it is possible to limit the object existing range by the aforementioned method. Thus, when an apex position of a small mountain as the rightmost point in FIG. 4 is the search position in the primary search, it is possible to reduce the processing time because no further judgment need not be performed.

The secondary search step 130 performs more detailed object search by using the secondary judgment unit 162. The secondary judgment unit 162 is formed by a plurality of stages each requiring a greater number of calculations than in the primary judgment unit but capable of accurately judging whether an object exists.

In the secondary search step 130, an object judgment process is executed by the secondary judgment unit for the several search positions decided in each object existing range obtained by the range estimation step 120. The number of cleared stages at each search position is recorded and outputted to the next object position estimation step 140.

FIGS. 6A and 6B show the relationship between the object existing range and the search position in the secondary search step. The search position for performing the object judgment process depends on the object position estimation method performed in the next object position estimation step 140. In order to measure the similarity mountain distribution, for example, as shown in FIG. 6A, five points covering the entire object existing range are made search positions.

In FIG. 6A, the search point 4 and the search point 5 are at the end points of the adjacent object existing range. Thus, when secondary-searching the adjacent object existing range at the right, since the search point 2 is the search point 4 of the left object existing range, no new object judgment process is needed.

As the search positions in the secondary search step 130, for example, it is possible to use the nine points in the object existing region as in FIG. 6B. When search is performed in this way, the number of processes performing the secondary search is increased but it is possible to obtain detailed similarity information and the estimation accuracy in the object position estimation step 140 is increased.

Moreover, when the secondary search results in that the average value or the maximum value of the output value of the entire search position is sufficiently low as compared to the number of stages of the secondary judgment unit, it is judged that no object exists in the range and no further step is performed.

The object position estimation step 140 estimates the position where the number of clear stages is maximum in the object existing range according to the information on the output value as the number of clear stages of each search position obtained in the secondary search step 130. This position is considered to be the object position in the object existing range.

FIGS. 7A and 7B show images of the object position estimation.

By approximating output values at a plurality of positions to a function, the apex position of the mountain in FIG. 2B is estimated to be an object position.

Hereinafter, explanation will be given on a case when the similarity mountain apex position is estimated by using a quadratic function approximation.

Like the search points 2, 3, 4 in FIG. 6A, three points arranged in a certain direction are respectively made search points p1, p2, (p1<p2<p3, p3−p2=p2−p1=Step) and output values obtained at search points are made O1, O2, O3, the apex position t1 may be calculated by the following Expression (1).

$$t_1 = p_2 + \left(\frac{O_1 - O_3}{2O_1 - 4O_2 + 2O_3}\right) * \text{Step} \quad (1)$$

When the secondary search is performed using five search points as in FIG. 7A, it is possible to calculate the apex position of the x direction from the output values of the search points 1, 3, 5 arranged in the horizontal direction.

Similarly, it is possible to calculate the apex position of the y direction from the output values of the search points 2, 3, 4 arranged in the vertical direction. It should be noted that it is possible to perform the secondary search only at the three points arranged in the horizontal direction and to estimate the apex position of the x-direction by the object position estimation step 140 before performing the secondary search of the three points in the vertical direction at the x-position, thereby estimating the apex in the y direction.

For example, as in FIG. 7B, the object position estimation may result in that the object position is outside the current object existing range. In such a case, it is possible to detect an object by the process in the adjacent object existing range and no further process is performed.

The final search step 150 performs an object judgment process in the object position estimated by the object position estimation step 140 by using the final judgment unit 163 so as to check whether an object actually exists.

As a result of the object judgment process, if all the stages are cleared, it is decided that an object exists at this position.

It is possible to rapidly detect an object by the aforementioned flow.

It should be noted that in order to detect an object of another size, the size of the object judgment device is modified and the aforementioned processes are repeated.

Embodiment 2

Figure 8:
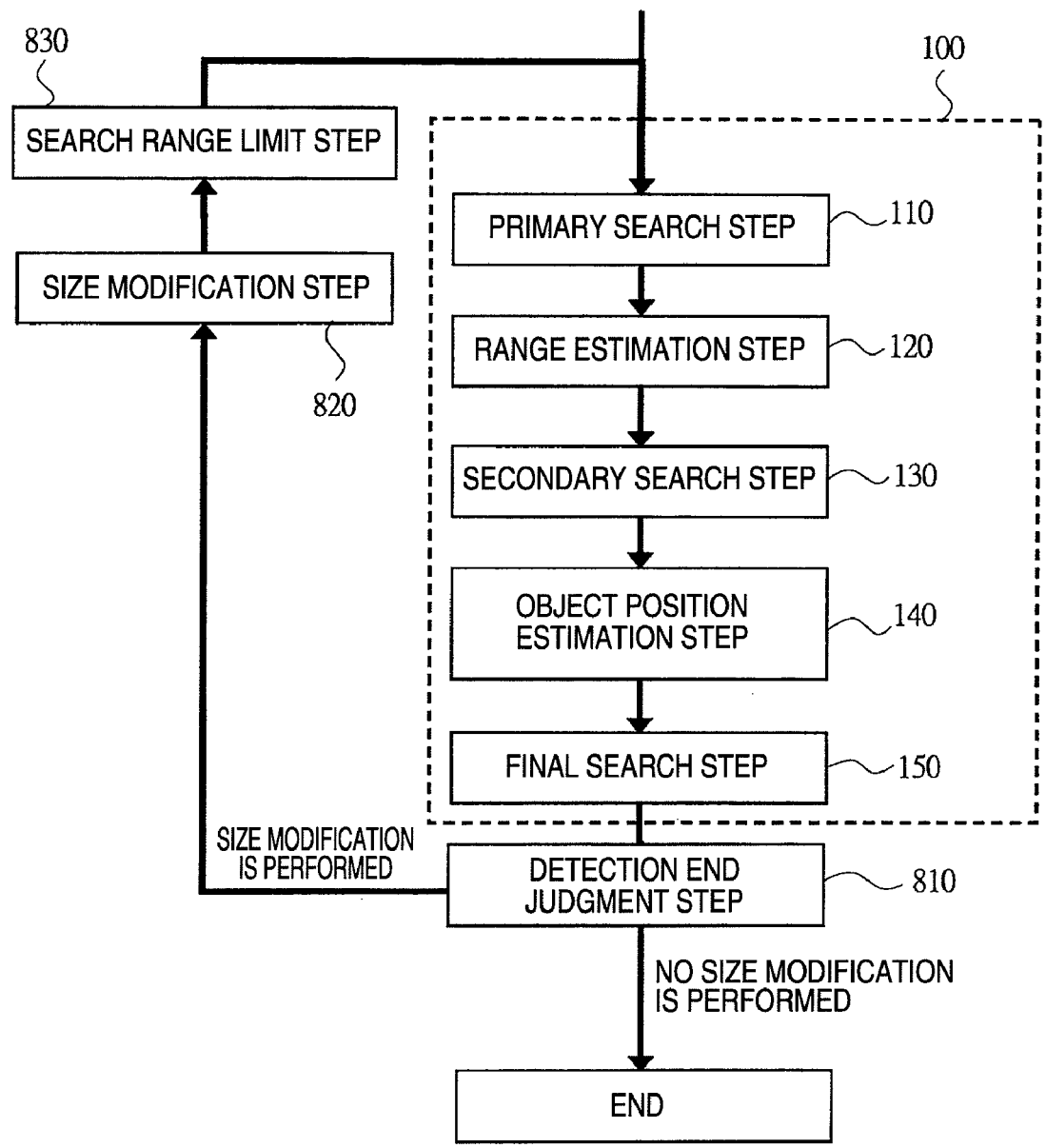
FIG. 8 is a flowchart showing an operation of the object detection method according to an embodiment of the present invention.

Referring to FIG. 8, explanation will be given on the operation of the object detection method according to a second embodiment of the present invention. FIG. 8 is a flowchart showing the operation of the object detection method according to a second embodiment of the present invention.

The second embodiment includes eight steps, five steps of which are identical to the first embodiment and three steps are added: a detection end judgment step 810, a size modification step 820, and a search range limit step 830. Thus, it is possible to rapidly detect objects of different sizes from the image.

Figure 9A:
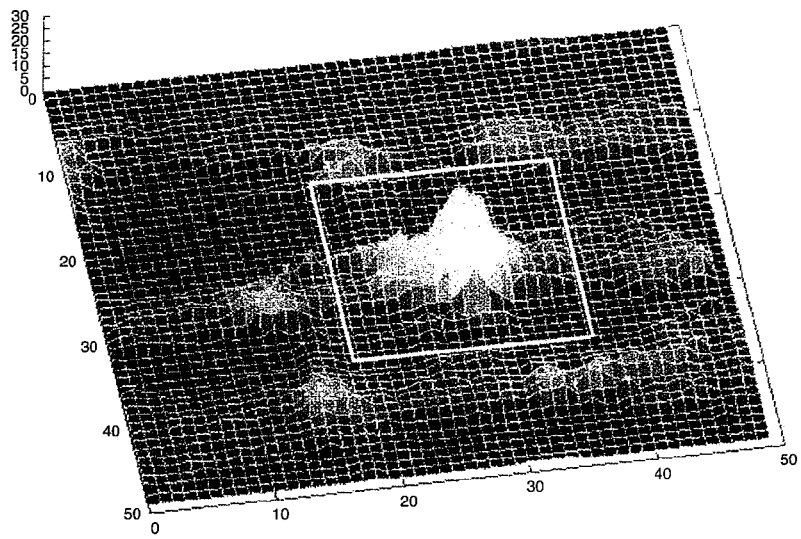
FIGS. 9A, 9B and 9C show results of an object judgement process of another size of the object detection method according to the embodiment of the present invention.
Figure 9B:
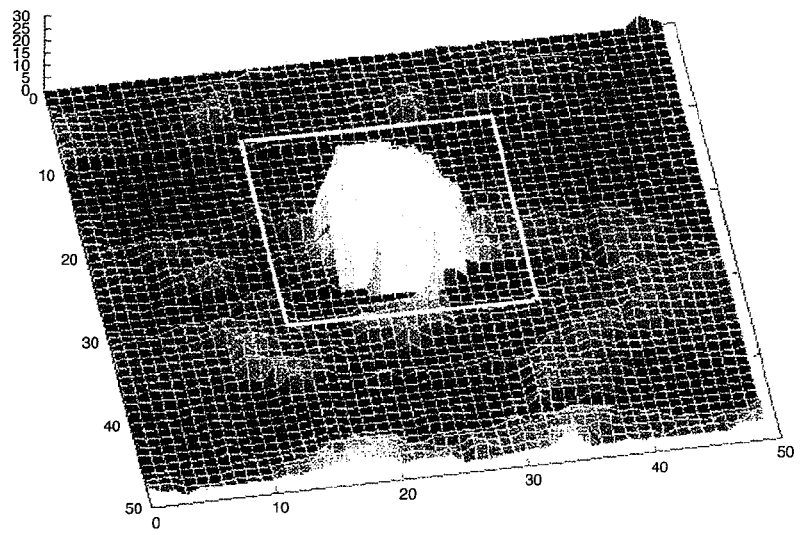
Figure 9C:
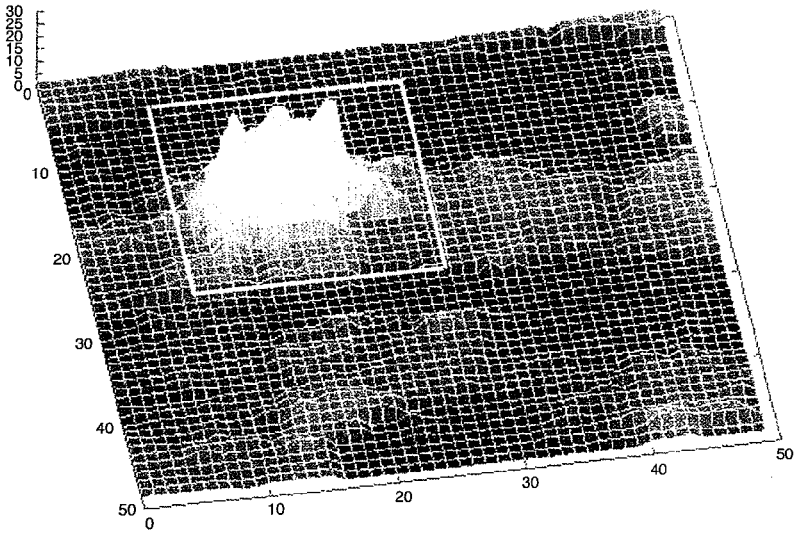
Figure 10A:
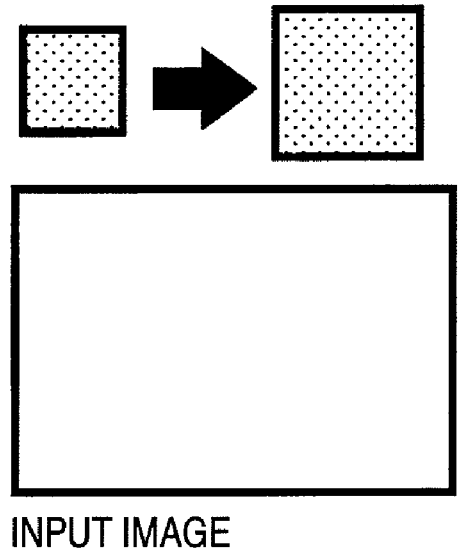
FIGS. 10A and 10B explain the size modification step of the object detection method according to the embodiment of the present invention.
Figure 10B:
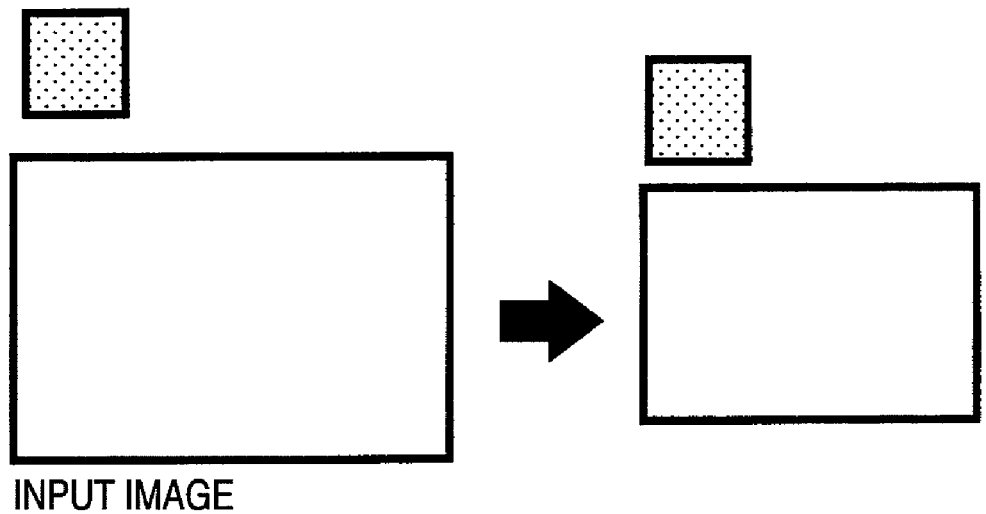
Figure 11:
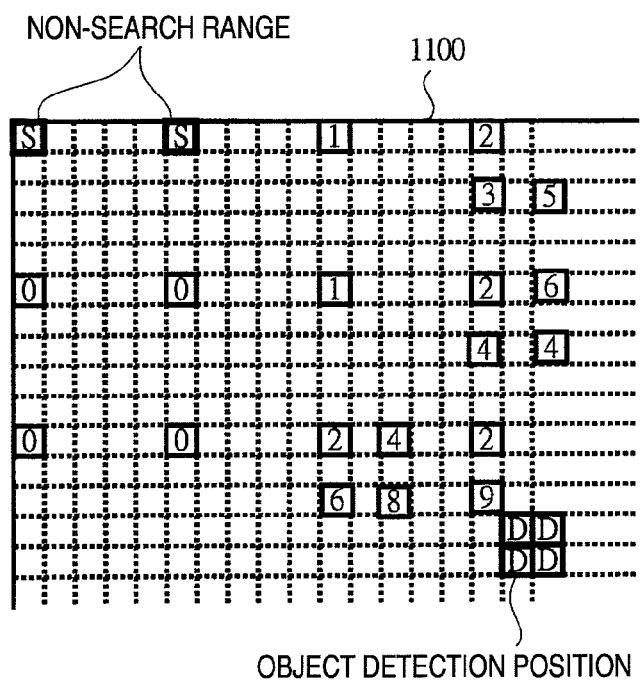
FIG. 11 explains a result storage memory used in the search range limit step of the object detection method according to the embodiment of the present invention.
Figure 12:
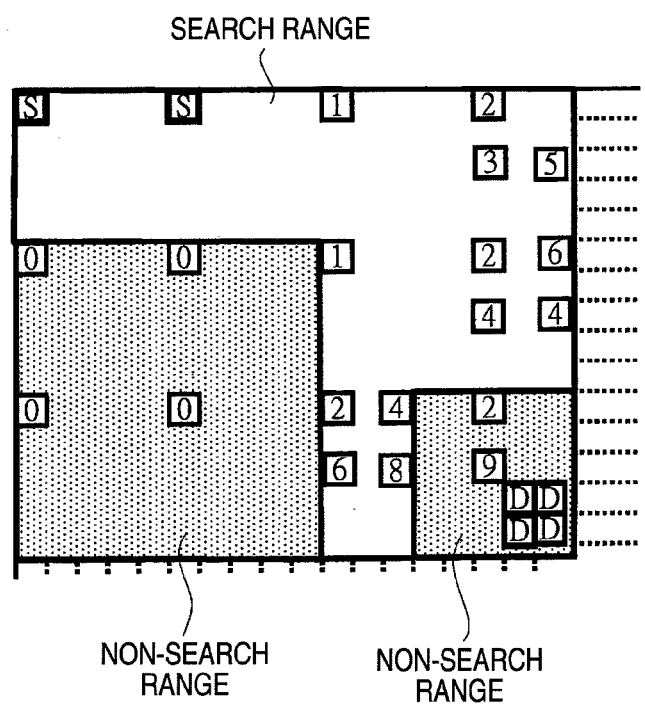
FIG. 12 shows a processing result of the search range limit step of the object detection method according to an embodiment of the present invention.

Next, referring to FIG. 8 through FIG. 12, explanation will be given on the operation of each step of the object detection method according to the second embodiment. FIGS. 9A, 9B and 9C show results of the object judgment process of other size performed in the object detection method according to the second embodiment of the present invention. FIGS. 10A and 10B explain the size modification step in the object detection method according to the second embodiment of the present invention. FIG. 11 explains a result storage memory used in the search range limit step in the object detection method according to the second embodiment of the present invention. FIG. 12 explains a processing result of the search range limit step in the object detection method according to the second embodiment of the present invention.

In this embodiment, firstly, according to the object detection method (process 100 in FIG. 8) shown in FIG. 1 of the embodiment, an input image is subjected to an object detection process of a certain size (this will be called a detection process N).

After this, in a detection end judgment step 810, the object size is updated and it is judged whether the updated size is within the search range so as to judge whether an object detection of another size (detection process N+1) is to be performed. If yes, control is passed to a size modification step 820. Otherwise, the process is terminated.

In the size modification step 820, size of the object to be detected is modified. Next, in a search range limit step 830, the search range in the detection process N+1 is limited according to the result of the detection process N. In the detection process N+1, the object detection like in the first embodiment is performed only on the limited search range.

As compared to the first embodiment using the relationship in the periphery of the position where an object exists, the second embodiment uses relationship of sizes of the object. In other words, the two-dimensional relationship is extended into a three-dimensional relationship.

The effectiveness of the detection method by the object detection method according to the present embodiment can be seen from the graphs shown in FIGS. 9A, 9B and 9C.

FIG. 9A, FIG. 9B and FIG. 9C show results of the object judgment process performed on all the positions in the image by using object judgment devices of the sizes x0.8, x1.9, and x1.3 multiple of the object to be detected, respectively.

The z axis in the graphs indicates the number of cleared stages as a result of the object judgment process performed at a certain coordinate position. The white frame indicates an object existing position.

From the graphs, it can be seen that even if the size of the object judgment device is modified, the process results have correlation. For this, if the modification is within a certain size, there is no problem in limiting the search range from the process result before the size modification.

Hereinafter, detailed explanation will be given on the size modification step 820 and the search range limit step 830.

In the size modification step 820, the size of the object to be detected is modified. More specifically, as shown in FIG. 10A, the window size of the object judgment device is made identical to the window size to be detected. Moreover, as shown in FIG. 10B, the size of the input image itself may be modified.

Next, explanation will be given on the search range limit step 830 by using FIG. 11.

FIG. 11 shows a result storage memory 1100. The result storage memory 1100 contains the number of stages cleared at each position and obtained as the result of a certain detection process N performed. In the search range limit step, the object search range in the detection process S+1 is limited according to the respective values in the result storage memory 110.

In FIG. 11, the positions where "S" is described are non-search positions, which indicates a range not requiring a search in the detection process N as a result of the detection process N−1. The non-search range where no search has been performed in the detection process S is made a search range in the detection process S+1.

Next, in FIG. 11, the positions where "D" is described are object detection positions which indicate that an object has been detected up to the detection process N. Since no case that an object of another size is detected again in the region where an object has been detected, no object search is performed around these positions. Accordingly, the non-search range remains as the non-search range in the detection process N+1.

In FIG. 11, the positions having numeric such as "0" and "1" are the positions where the object judgment process has been performed in the detection process N. The stored numeric limit the search range in the detection process S+1.

More specifically, the positions which has not cleared the primary search step 110 are made a non-search range. Moreover, the positions where no object has been detected but the number of stages equal to or above a certain threshold value T is made a search range. As is clear from FIG. 9A and FIG. 9C, the mountain width is reduced for the object of the different size. For this, it is preferable to set a wide search range.

By performing the aforementioned process, the search range and the non-search range in the detection process S+1 are decided. From the result storage memory 1100 of FIG. 11, for example, it is possible to obtain a search range and a non-search range shown in FIG. 12.

In the search range limit step 830 and after, the object detection is performed only for the search range by the method explained in the first embodiment. Here, the number of stages cleared as a result of the object judgment process performed at each position is recorded in the result storage memory 1100.

By using the aforementioned flow, it is possible to rapidly detect an object.

Embodiment 3

Figure 13:
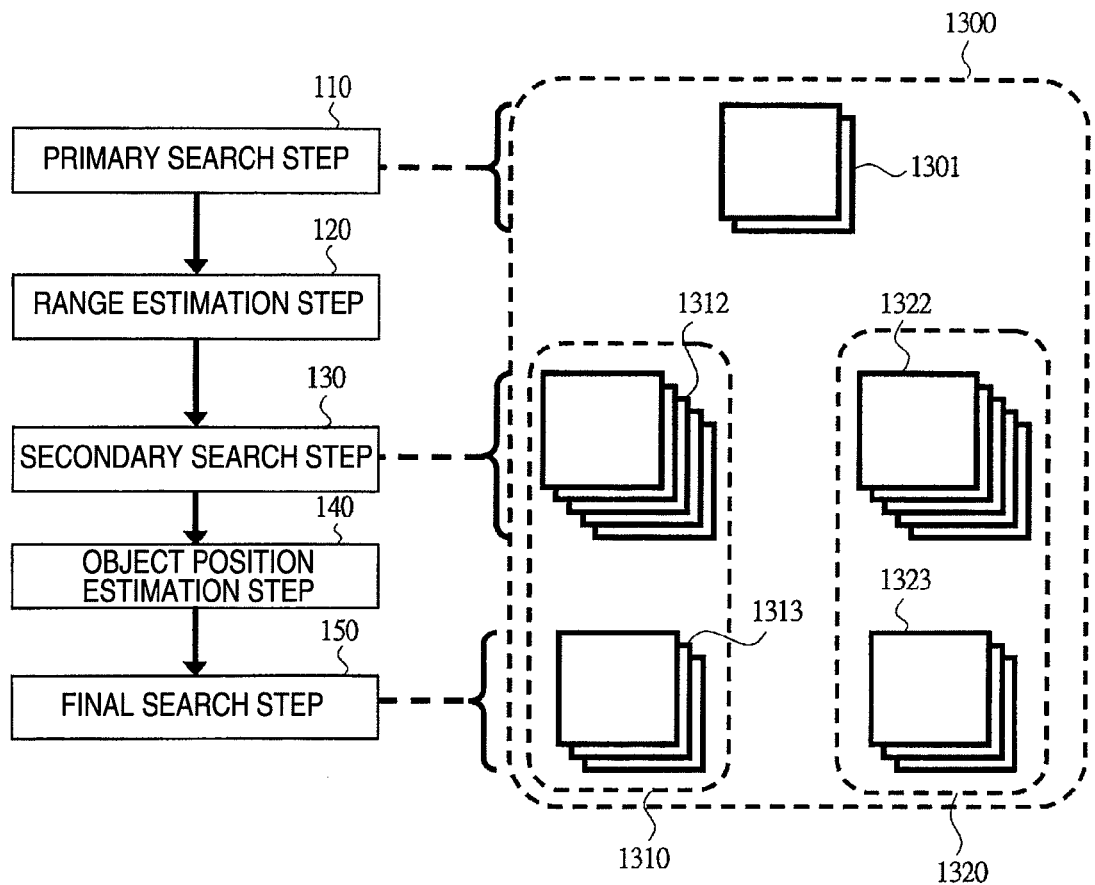
FIG. 13 is a flowchart showing an operation of the object detection method according to an embodiment of the present invention.

Referring to FIG. 13, explanation will be given on the operation of the object detection method according to a third embodiment of the present invention. FIG. 13 is a flowchart showing the operation of the object detection method according to the third embodiment of the present invention.

The third embodiment is a method for rapidly detecting an object to be detected even if it is directed to a different direction. This enables detection of a side face as compared to the conventional method which can detect only a face directed within plus minus several degrees from the front view.

In FIG. 13, for a multi-direction judgment device 1300 used for object detection, the same unit is used for the primary judgment unit 1301 and different units are prepared for the secondary judgment unit and after for each direction.

For example, a front-directed object judgment unit 1310 and a right-directed object judgment unit 1320 are used. If object of more directions are to be detected, for example, a left-directed object judgment unit may be added.

The primary judgment unit 1301 is a general-purpose judgment unit which may detect an object directed in various directions and can discard a certain rate of those which are not objects. In such a judgment device, sufficient ability cannot be obtained even if the number of stages is increased. For this, the primary judgment unit performs simple object judgment and after this a judgment unit corresponding to each direction is used for judgment.

Next, referring to FIG. 13, explanation will be given on an object search process of plural directions by using multi-direction object judgment device of the object detection method according to the third embodiment of the present invention.

Firstly, the primary search step 110 and the range estimation step 120 are performed by using the primary judgment unit 1301 in the same way as in the first embodiment.

The secondary search and after are performed for each direction of the object to be detected.

That is, by using the front-directed secondary judgment unit 1312 of the front-directed object judgment unit 1310, the secondary search step 130 and the object position estimation step 140 are executed and by using the front-directed final judgment unit 1313 of the front-directed object judgment unit 1310, the final search step 150 is executed. After this, by using the right-directed secondary judgment unit 1322 and the right-directed final judgment unit 1323 of the right-directed object judgment unit 1320, the similar search process is performed.

Here, when an object is detected in an object search of a certain direction, no search is performed upon object search of a different direction for the position detected.

By the aforementioned process, it is possible to rapidly detect an object directed in various directions.

Embodiment 4

Figure 14:
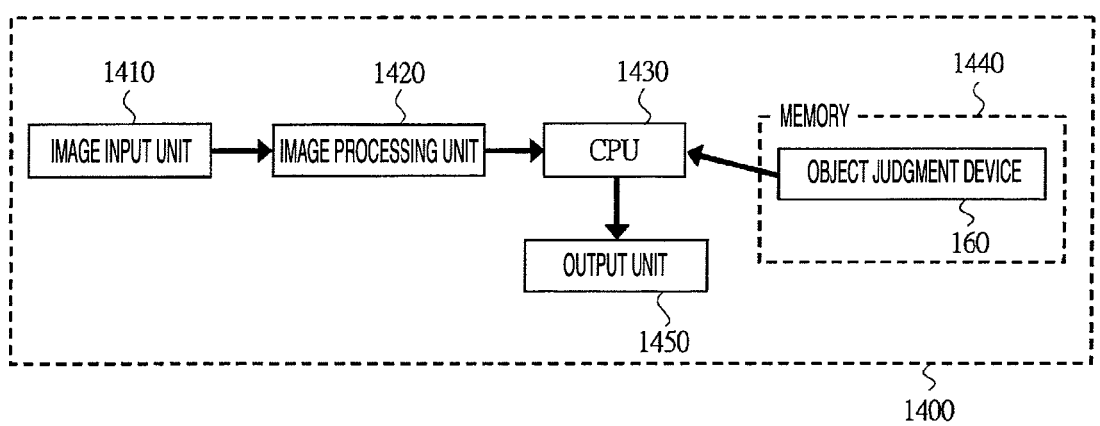
FIG. 14 shows a configuration of an object search device using the object detection method according to an embodiment of the present invention.

Referring to FIG. 14, explanation will be given on the configuration of the object detection device using the object detection method according to a fourth embodiment of the present invention. FIG. 14 shows configuration of the object detection device using the object detection method according to the fourth embodiment of the present invention.

In FIG. 14, an object detection device 1400 is formed by an image input unit 1410, an image processing unit 1420, a CPU 1430, a memory 1440, and an output unit 1450. The memory 1440 includes an object judgment unit 160. The CPU 1430 performs a process while referencing the memory 1440.

Next, explanation will be given on the operation of the object detection device using the object detection method according to the fourth embodiment of the present invention.

Firstly, the image input unit 1410 receives an image obtained by an imaging device such as a camera as an input image. Next, the image processing unit 1420 performs pre-processing on the image for performing object detection.

The pre-processing includes a filtering process such as an image reduction and smoothing.

Next, the CPU 1430 performs an object detection process according to an object detection method.

Lastly, the output unit 1450 receives an object detection result obtained by the CPU 1430 and reports the detection result.

A device including the object detection device 1400 performs a process in accordance with the report result. For example, the detection results are all made into indexes and further process is performed on the image at the position detected.

The present invention has been thus far explained specifically according to the embodiments. However, the present invention is not to be limited to the embodiments but may be modified in various ways without departing from the spirit of the invention.

The present invention relates to an object detection method for detecting a particular object such as a face in an image and can be applied to a device and a system for detecting existence of an object from an image.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An object detection method comprising:
    a primary search step which performs an object judgment process on positions at a particular interval on an input image by using a primary judgment device for judging presence/absence of an object in a specified image frame by a first calculation quantity;
    a range estimation step which estimates a range where an object exists according to the primary search step;
    a secondary search step which performs an object judgment process by using a secondary judgment device for judging presence/absence of an object by a second calculation quantity greater than the first primary judgment device for each of one or more object existing ranges obtained by the range estimation step and acquiring similarity with the object;
    a position estimation step which estimates a position where the object exists by using the similarity obtained by the secondary search step; and
    a final search step which performs an object judgment process by using a final judgment device for judging the presence/absence of an object by a third calculation quantity which is equal to or greater than the secondary judgment device and judges whether an object actually exists.

2. The object detection method as claimed in claim 1, wherein the primary search step sets the particular interval to one third of the size of the object to be detected by the primary judgment device.

3. The object detection method as claimed in claim 1, wherein the range estimation step estimates that the position around the input image is a range where an object exists if the primary search step is cleared even at a peripheral position adjacent to a certain position on the input image which has cleared the primary search step.

4. The object detection method as claimed in claim 1, wherein the similarity with an object to be outputted in the secondary search step is the number of stages cleared when the object judgment process is performed by using the secondary judgment device formed by a plurality of stages.

5. The object detection method as claimed in claim 1, wherein the position estimation step performs quadratic function approximation of the similarity with the object at east position obtained as the result of the secondary search step and calculates the position of the input image where the similarity with the object becomes maximum, thereby estimating the position where the object exists.

6. The object detection method as claimed in claim 1, further comprising:
   a detection end judgment step which judges whether to perform object detection of other size;
   a size modification step which modifies the detection size of the first judgment device, the second judgment device, and the final judgment device according to the judgment result of the detection end judgment step; and
   a search range limit step which limits the range of an input image where object detection of the current size is performed according to the result of the object detection of the previous size.

7. The object detection method as claimed in claim 1, further comprising:
   a detection end judgment step which judges whether to perform an object detection of other size;
   a size modification step which modifies the size of the input image according to the judgment result of the detection end judgment step; and
   a search range limit step which limits the range of the input image where an objection detection of the current size is performed according to the result of the object detection of the previous size.

8. The object detection method as claimed in claim 6, wherein the search range limit step performs no object detection of the current size in a peripheral region of the position which has not cleared the primary search step upon object detection of the previous size.

9. The object detection method as claimed in claim 7, wherein the search range limit step performs no object detection of the current size for the peripheral region of the position which has not cleared the primary search step upon object detection of the previous size.

10. The object detection method as claimed in claim 1, wherein the primary search step and the range estimation step performs an object judgment process by using an object judgment device for detecting an object directed into a plurality of directions, as the primary judgment device;
   and wherein the secondary search step, the position estimation step, and the final search step perform an object judgment process by using a plurality of definite-direction object judgment devices for detecting only objects directed to a certain definite direction range, as the secondary judgment device and the final judgment device.

11. The object detection method as claimed in claim 1, wherein the object to be detected is a face.

* * * * *